United States Patent [19]

Smith, Jr.

[11] 3,865,262

[45] Feb. 11, 1975

[54] MATERIAL HANDLING METHOD AND APPARATUS

[76] Inventor: Raymond E. Smith, Jr., 385 Greenwood Ave, Lake Forest, Ill. 60045

[22] Filed: Mar. 12, 1973

[21] Appl. No.: 340,343

[52] U.S. Cl............... 214/152, 214/38 D, 254/124, 214/515
[51] Int. Cl............................................. B60p 1/64
[58] Field of Search.................. 214/515, 350–355, 214/38 D; 296/1 A; 254/124

[56] References Cited
UNITED STATES PATENTS

| | | | |
|---|---|---|---|
| 2,565,820 | 8/1951 | Machanic | 214/515 X |
| 2,841,438 | 7/1958 | Weil | 214/515 X |

Primary Examiner—Albert J. Makay
Attorney, Agent, or Firm—Hume, Clement, Brinks, Willian, Olds & Cook

[57] ABSTRACT

A method of handling containerized freight to transfer it from an airline cargo facility or the like to its transferee, and apparatus which is effectively used in the performance of the method. The method involves loading freight in a transfer van or the like, moving the freight to the transferee and unloading it, all without the aid of separate equipment at each end. The apparatus is a sled to which a freight container is fastened. The sled has power operated lift legs which are operated sequentially to raise and lower the sled and container to the level of a van floor from a ground floor. The sled is castered to facilitate easy movement in any direction on the ground or van floor.

5 Claims, 5 Drawing Figures

MATERIAL HANDLING METHOD AND APPARATUS

FIELD OF THE INVENTION

This invention is in the field of material handling. It relates particularly to transferring containerized freight or the like.

BACKGROUND OF THE INVENTION

When freight is unloaded from a cargo airplane, for example, it is normal for the freight to be stored in a warehouse hangar or the like until picked up by a van for trans-shipment to its consignee. Normally the freight is loaded onto and off of the transferring van by equipment provided at both ends of the transfer. Obviously, the necessity of maintaining such equipment on the part of both the airline and the transferee is expensive. Furthermore, the transferee might have only occasional use for it. The airlines, particularly, have long sought a method of transferring freight without the use of conventional freight loading and unloading equipment.

SUMMARY OF THE INVENTION

The present invention is embodied in a new method and apparatus for transferring containerized freight or the like. An object of the invention is to provide a greatly improved material handling method which does not require separate material handling equipment at transfer point and destination. Another object is to provide a material handling method which lowers the cost of freigt transfer. Still another object is to provide apparatus which can advantageously be used to perform the method of the invention.

The foregoing and other objects are realized by providing a method wherein a freight container, for example, is positioned on a platform interface in a cargo hangar or the like, ready for trans-shipment by van. The container is moved horizontally onto the deck of a sled which is castered to support it for movement on the relatively flat surface of the cargo hangar floor. The sled deck is the same height of the interface. The container is fastened to the deck. The sled is then moved to a point immediately adjacent the open cargo door of a transfer van, for example, which might have its cargo body floor situated approximately four to five feet above the hangar floor.

The sled has, pivotally secured to its bottom surface and approximately in the middle of the sled, an elongated front lift leg. This lift leg extends toward the "front" of the sled and has, on its free, forwardmost end, transversely disposed feet on which wheels are also mounted. The forwardly extending leg terminates short of the front end casters of the sled.

Mounted on the sled at a pivotal connection is a first fluid motor complex. This fluid motor complex is also pivotally connected to the lift leg, whereby it can be actuated to pivot the leg about its own pivotal connection.

With the sled and its container in position in front of the van door, another lift leg, pivotally connected to the bottom of the deck, is positioned so that its connection to the sled is at the rear of the sled and its free end extends outwardly of the rear end to wheeled feet at the free end of the lift leg. This rearwardly extending lift leg has a second fluid motor complex pivotally connecting it to the sled and effective, upon actuation, to pivot the rear leg about its own pivotal connection.

The fluid motor on the front lift leg is first extended to pivot the front lift leg about its pivotal connection to the bottom of the sled. With the wheeled feet of the front lift leg acting as a moving support, the front end of the sled adjacent the van door is raised upwardly to a point where its wheels are above the level of the van floor, at the door. During this lifting operation, the sled and its fastened container are guarded against tipping over backward by the back leg, which trails or extends outwardly from the rear end of the sled and, by virtue of its fluid motor connection to the rear of the sled, limits backwardly tilting movement of the sled.

With the sled tilted upwardly in the aforedescribed manner, supported by the sled's back caster wheels and the wheeled feet of the front lift leg, the tilted sled is pushed forwardly until its front caster wheels overlie the van floor immediately adjacent the edge of the floor at the cargo door. The fluid motor complex for the front leg is then operated to lower the front end of the sled relative to this lift leg, permitting the front end of the sled, or rather its caster wheels, to come to rest on the van floor.

The fluid motor complex pivotally connecting the back lift leg to the rear of the sled is now actuated. This forces the rear end of the sled upwardly, supported on the wheeled feet of the back lift leg. when the sled reaches a horizontal position, or one slightly inclined upwardly therefrom, the sled is rolled on its front casters and the wheels of the back lift leg into the cargo van until the rear casters of the sled overlie the van floor. The fluid motor complex on the back lift leg is then de-actuated to permit the rear caster wheels of the sled to come to rest on the van floor.

With the sled and its fastened container now resting on the van floor, the back leg is released from fixed attachment at its pivotal connection to the sled and is moved inboard of the sled. This back lift leg is then stored under the sled, retained there by a suitable bracket.

When the van reaches its destination, the reverse of the aforedescribed loading operation is performed. The container, still fastened to the sled, is positioned with the rear of the sled adjacent the now-opened van door. The back lift leg is extended out of the door and fixed relative to its pivotal connection to the rear of the sled once again. The free end of the back lift leg is then permitted to drop to the floor supporting the van, and the fluid motor of this lift leg actuated to raise the rear end of the sled slightly off the floor of the van.

The sled, with its fastened container, is rolled outwardly of the open van door on the front casters of the sled and the free end wheels of the back lift leg until the front caster wheels of the sled are immediately adjacent the edge of the van floor. At this point, the fluid motor on the back lift leg is slowly de-actuated to lower the rear end of the sled to the floor, its rear casters coming to rest on the ground floor.

The fluid motor of the front lift leg is then actuated to extend the front lift leg downwardly until its free end wheels come into contact with the ground floor. This fluid motor is actuated until the front casters of the sled are lifted slightly off the van floor. The sled and its fastened container are then rolled on the ground floor supporting the van away from the van door. With the front end of the sled now free of the van, the fluid motor associated with the front lift leg is slowly deactuated and the front end of the sled sinks until its front casters engage the floor.

The sled and its fastened container are then rolled on the casters of the sled to a point immediately adjacent a platform interface whose height coincides with the height of the sled deck. Anti-friction rollers or the like on the surface of the deck facilitate easily moving the container, once its fastening to the sled is released, off the sled and onto the platform interface.

The sled can then be returned by the transfer van to the airline, for example. If a relatively small or light version of the sled is employed, it can be manually loaded onto the van for return. If, as frequently is the case, however, the sled is also a relatively large structure for handling large freight containers, it can load and unload itself, so to speak, in the same manner as when mounting a container.

BRIEF DESCRIPTION OF THE DRAWINGS

The invention, together with its construction and method of operation, along with other objects and advantages thereof, is illustrated more or less diagrammatically in the drawings, in which.

DESCRIPTION OF THE PREFERRED EMBODIMENTS

Figure 2:
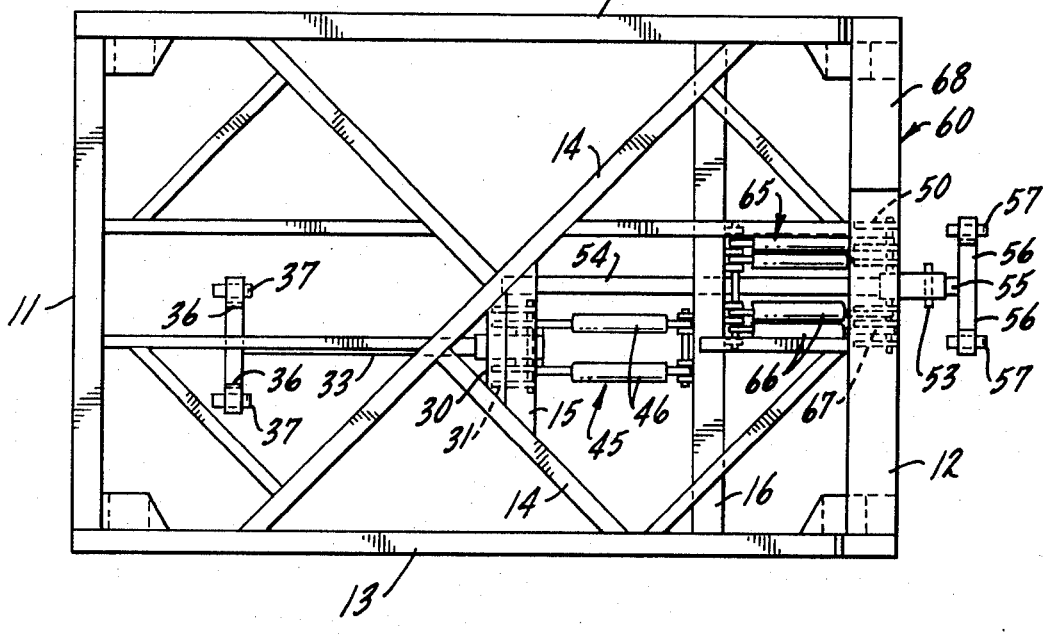
FIG. 2 is a top plan view of the sled apparatus seen in FIG. 1.
Figure 1:
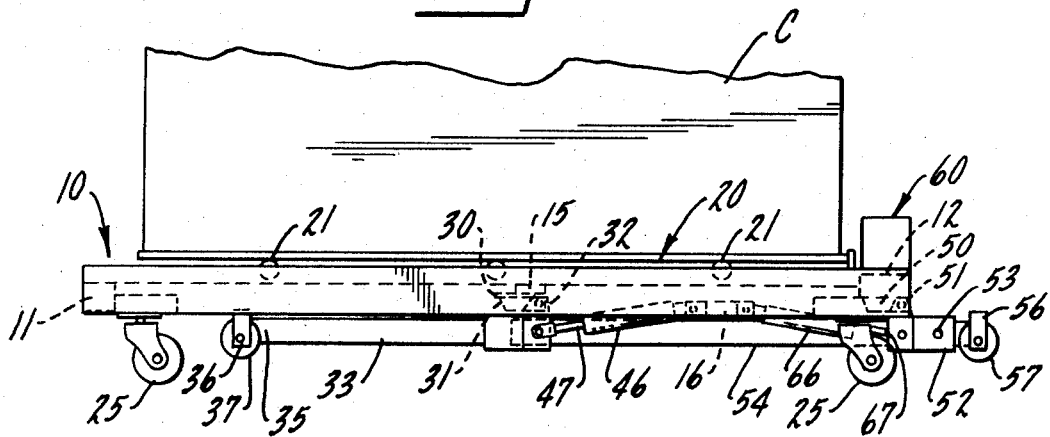
FIG. 1 is a side elevational of a sled apparatus embodying features of the present invention.

Referring now to the drawings, and particularly to FIGS. 1 and 2, apparatus embodying the invention which can be advantageously employed in performing the method of the invention is seen at 10. The apparatus 10 comprises a sled which is rectangular in plan configuration and fabricated of welded tubular steel front frame member 11, back frame member 12, side frame members 13, and diagonal cross frame members 14. Two transversely extending tubular frame members 15 and 16 extend parallel to the frame members 11 and 12 between them.

A "deck" 20 is formed on the frame members by three parallel sets of anti-friction rollers 21. The rollers 21 protrude above the upper surface of the deck in the manner illustrated. Beneath the sled, at the four corners of the frame members 11–13 are conventional casters 25. The casters 25 support the sled 10 for rolling movement on any relatively flat surface and in any direction. Conventional locking means (not shown) are provided with each of the four casters 25 to lock and prevent caster wheel rotation when desired.

Approximately in the center of the sled 10, to one side of its longitudinal centerline, underneath the sled and welded to the diagonal cross members 14 and 15, is a mounting plate 30. Depending lugs 31 pivot connection are mounted on the mounting plate 30. Pinned to the lugs 31 are ears 32 affixed to one end of a lift leg 33 which extends toward the front end of the sled 10. The lift leg 33 might be fabricated of reinforced tubular steel, or a channel. The ears 32 are offset upwardly from it, as seen in FIG. 1.

The forward, or free end 35 of the lift leg 33 has transversely disposed feet 36, also fabricated of tubular steel, welded thereto. On each of the transversely extending feet 36 is mounted a wheel 37. Conventional locking arrangements similar to the locking arrangements hereinbefore referred to are provided on the casters to lock them when desired. The leg is effecitvely 49 ¾ inches long.

Also mounted underneath the sled 10, pivotally connected to both the sled frame member 14 and the lift leg 33, is a pair of fluid motors 45. As best seen in FIG. 1, the cylinders 46 of the fluid motors 45 are pivotally connected to the front frame member 14, while the pistons 47 of the motors are pivotally connected to opposite sides of the lift leg 33. The pivotal connections between the pistons 47 and the lift leg 33 are positioned so that the leg can forcefully be moved from a position immediately under the sled 10, parallel to it, to one nearly perpendicular to it.

Under the rear end of the sled 10, a series of six depending lugs 50 are welded to the rear frame member 12. Pivotally connected to these lugs 50 by six corresponding, upwardly extending ears 51, is a square cross-section sleeve section 52. Slidable in the sleeve section 52, and releasably fixed thereto by a removable pin 53, is a back lift leg 54 which extends rearwardly from under the rear end of the sled 10.

The back end 55 of the lift leg 54 has a pair of transversely disposed feet 56 welded thereto. Each of the feet 56 mounts a wheel 57 similar to the wheels 37 hereinbefore discussed. A locking conventional wheel arrangement provides a locking capability.

Connecting the lift leg 54 to the sled 10 are four more fluid motors 65. The cylinders 66 of the fluid motors 65 are pivotally connected to the frame member 16, while the pistons 67 are pivotally connected to the outer end of the sleeve 52. The connections of the piston 67 to the sleeve 52 are positioned so that the leg 54 can be forcefully pivoted between a position approximately 40° above horizontally to the rear of the sled and a position almost vertical downwardly of the sled.

The fluid motors 45 and 65 are all supplied with fluid under pressure from a fluid power pack 60 mounted on the top of the frame member 12, accessible to an operator. The power pack contains a conventional fluid pump of appropriate capacity and a suitable prime mover or connections for an outside power source.

The power pack 60 distribution of fluid under pressure is controlled by a conventional valve arrangement 65. Manipulation of the valve arrangement 65 in a conventional manner is effective to selectively extend or retract pistons 47 of the fluid motors 45 or do the same with the fluid motors 65.

Figure 3:
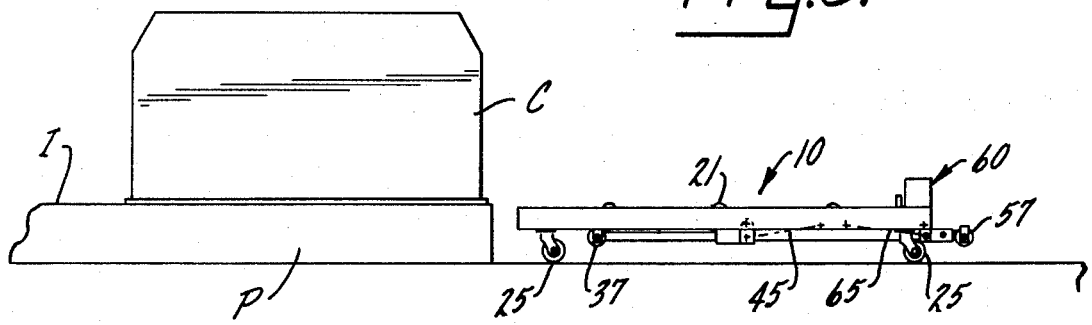
FIG. 3 is a side view diagram of a stage in the method embodying features of the invention.
Figure 4:
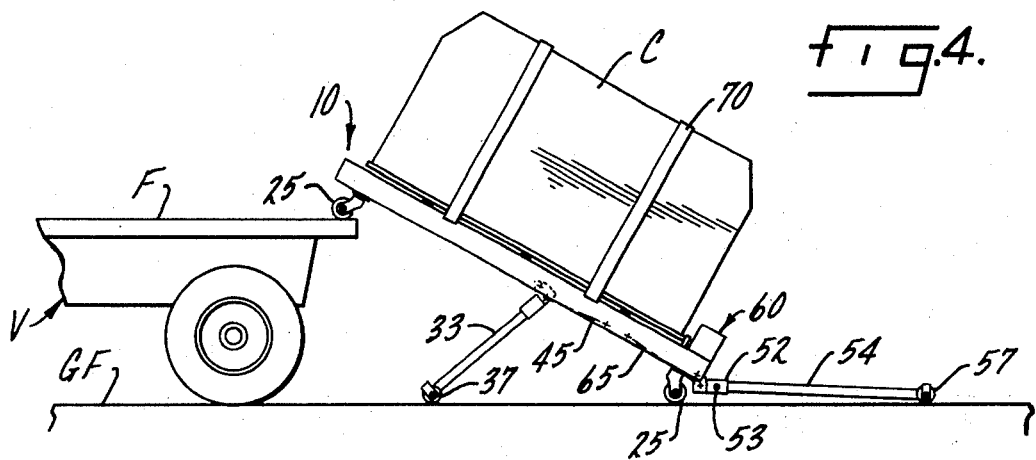
FIG. 4 is a side view diagram of another stage in the method.
Figure 5:
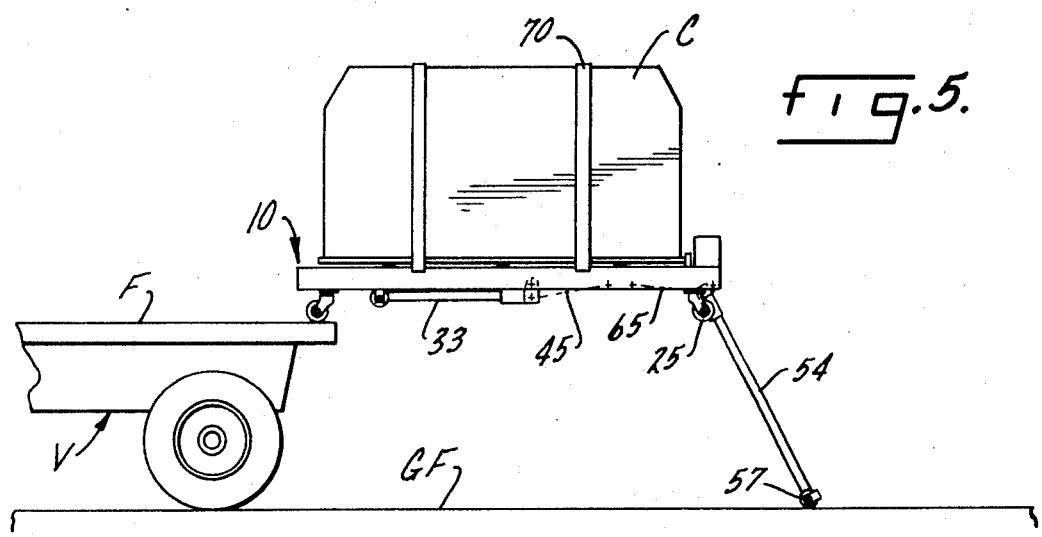
FIG. 5 is a side view diagram of yet another stage in the method operation embodying features of the invention.

Turning now to FIGS. 3–5, the method of the invention is illustrated diagrammatically. In FIG. 3, a container C is seen resting on the platform interface I of a platform P. The platform might be in a cargo hangar of an airline, for example, and the container C has arrived by airfreight and is awaiting trans-shipment to its transferee in a neighboring city.

The sled 10 is rolled up immediately adjacent the platform P. The container C is moved horizontally onto the "deck" 20 of the sled 10 on the rollers 21 thereof. At this point, suitable fastening means such as a strap arrangement 70 are employed to fasten the container securely to the sled deck 21.

The sled 10 carrying the container C is then rolled on its casters 25 to a point immediately adjacent the open door of a transfer van V. The van floor F is positioned 4 to 5 feet above the ground floor GF of the hangar, for example.

At this point the lift leg 54, which has been telescoped through its sleeve 52 to where its normally inner end underlies the center of the sled 10, is extended into trailing relationship and the pin 53 inserted to lock it. The leg 54 then extends rearwardly of the sled 10, resting on the ground floor GF.

At this point, the fluid motors 45 associated with the lift leg 33 are actuated to extend it. Actuating these fluid motors 45 is effective to tilt the sled upwardly, in the manner illustrated in FIG. 4, until the front casters 25 of the sled are slightly higher than the level of the van floor F. The sled is, in this position, supported by the wheels 35 on the feet 36 of the lift leg 33 and the casters 25 on the rear end of the sled.

Regardless of the center of gravity of the container C, the sled cannot tilt over backwardly because the lift leg 54 acts as an outrigger extending rearwardly. The limits of travel of the fluid motor 65 are such that if the sled should happen to start tilting rearwardly, these limits are quickly reached, breaking the movement.

With the sled 10 tilted upwardly, it is pushed forwardly until its front casters 25 overlie the van floor F. Fluid motors 45 are then actuated to lower the front end of the sled until the front casters rest on the van floor F.

The fluid motors 65 connected to the back lift leg 54 are then actuated by the operator. The lift leg 54 is drawn toward and under the sled 10, forcing the rear end of the sled upwardly, supported on the wheels 57 of the back lift leg 54. When the sled 10 reaches a horizontal position, such as seen in FIG. 5, or one slightly inclined upwardly therefrom, it is rolled forward on its front casters 25 and the wheels 57 in the cargo van until the rear casters 25 of the sled overlie the van floor F. Fluid motors 65 are then actuated to cause the rear casters 25 of the sled 10 to come to rest on the van floor F.

With the sled 10 and its fastened container C now resting on the van floor F, the back leg 54 is released from the sleeve 52 by removing the pin 53. The leg 54 is pivoted up until parallel with the side frame members 15 of the sled and then telescoped through the sleeve 52 until its inner end comes to rest on a suitably positioned angle iron underneath the center of the sled on which the leg then rests. In this position, the feet 56 and wheels 57 on the leg 54 are positioned immediately adjacent the back casters 25 on the sled 10.

The van delivers both the container and the sled 10 to its transferee. When the van reaches its destination, the reverse of the aforedescribed loading operation is performed to effect an unloading of the container on the sled. Since this has been thoroughly discussed in the preliminary summary of the invention, it is not repeated here. The immediately foregoing discussion of the loading operation is sufficient to a detailed understanding.

The container C can then be removed from the sled onto a platform interface of the same height. In this regard, the platform interface height and sled deck height preferred and employed with the illustrative sled and method is 20 inches. Obviously, it might vary.

The relative lengths of the legs 33 and 54 have been given. The leg 54 is substantially longer than the leg 33, as will be noted. This relationship is important to the success of the apparatus.

I claim:

1. Apparatus for raising a body of material from a lower surface onto an upper surface or lowering a body of material from an upper surface onto a lower surface, comprising:
   a. normally horizontal sled means,
   b. said sled means having a front end supported on anti-friction means and a back end supported on anti-friction means,
   c. deck means on said sled means for supporting a body of material,
   d. means for fastening the body to said deck means,
   e. leg means pivotally connected to said deck means underneath said deck means and having free end means horizontally displaced from any connection to said sled means,
   f. said free end means having anti-friction means thereon,
   g. said leg means comprising at least a front lift leg and a relatively longer back lift leg with the pivotal connection between said front lift leg and said sled means being disposed substantially mid-way between the front and back ends of said sled means, and
   h. power means between said deck means and said leg means and effective upon actuation to pivot said leg means to raise or lower said deck means.

2. The apparatus of claim 1 further characterized in that:
   a. said front lift leg is pivotally connected to said sled means adjacent its longitudinal center,
   b. said back leg means being pivotally connected to said sled means adjacent its longitudinal rear.

3. The apparatus of claim 2 further characterized in that:
   a. said back lift leg is longer than said front lift leg.

4. The apparatus of claim 1 further characterized in that:
   a. said front lift leg and said back lift leg are independently movable about corresponding pivotal connections by power means mounted on said sled means.

5. A method of transferring freight in a container or the like, comprising the steps of:
   a. moving the container horizontally from an interface on which it is supported onto a sled having a deck which is level with said interface,
   b. fastening the container to said deck,
   c. moving said sled horizontally on a ground floor or the like to a position adjacent a transfer vehicle,
   d. raising one end of said sled until said one end is higher than the vehicle floor,
   e. moving said sled toward said vehicle until said one end of said sled overlies said vehicle floor,
   f. lowering said one end of said sled onto said vehicle floor,
   g. raising the opposite end of said sled to a point level with the vehicle floor or only slightly above said vehicle floor, h. moving said sled into said vehicle while supporting said one end of the sled from the vehicle floor and the other end of the sled from the ground floor,
i. lowering the other end of said sled onto the vehicle floor,
j. transferring the container to a transferee while fastened to the sled in the vehicle,
k. raising said opposite end of said sled from the ground floor so that said opposite end of said sled is supported at or above the level of the vehicle floor,
l. moving said sled out of said vehicle while supporting said one end of said sled on said vehicle floor and the opposite end of said sled from the ground floor,
m. lowering the opposite end of said sled to the ground floor while the front end of said sled remains supported on the vehicle floor,
n. raising the one end of said sled from the ground floor to the level of or slightly above the level of the vehicle floor,
o. moving said sled away from said vehicle,
p. lowering said one end of said sled into engagement with the ground floor,
q. moving said sled with its fastened container into a position adjacent an elevated interface level with the deck of said sled,
r. unfastening said container and moving said container horizontally off of said sled onto said interface.

* * * * *